United States Patent
Yamamoto et al.

(10) Patent No.: US 9,175,823 B2
(45) Date of Patent: Nov. 3, 2015

(54) VEHICULAR HEADLAMP

(71) Applicant: KOITO MANUFACTURING CO., LTD., Tokyo (JP)

(72) Inventors: Ippei Yamamoto, Shizuoka (JP); Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 27 days.

(21) Appl. No.: 14/140,045

(22) Filed: Dec. 24, 2013

(65) Prior Publication Data

US 2014/0198517 A1    Jul. 17, 2014

(30) Foreign Application Priority Data

Jan. 16, 2013   (JP) .................................. 2013-005408

(51) Int. Cl.
  *F21S 8/10*   (2006.01)
  *B60Q 1/00*   (2006.01)

(52) U.S. Cl.
  CPC ........... *F21S 48/1159* (2013.01); *B60Q 1/0041* (2013.01)

(58) Field of Classification Search
  CPC ............................... F21S 48/10; F21S 48/1747
  USPC .......................................... 362/538, 543, 544
  See application file for complete search history.

(56) References Cited

U.S. PATENT DOCUMENTS

2003/0198060 A1 * 10/2003 Ishida et al. .................. 362/516

FOREIGN PATENT DOCUMENTS

| JP | 2004095480 | 3/2004 |
| JP | 2007134052 | 5/2007 |

* cited by examiner

*Primary Examiner* — David V Bruce
(74) *Attorney, Agent, or Firm* — Abelman, Frayne & Schwab

(57) ABSTRACT

Disclosed is a vehicular headlamp including: a basic lamp unit configured to form a main light distribution pattern that is controlled in light distribution so as to satisfy illuminance requirements at a plurality of predetermined sites in a low beam light distribution pattern which is projected on a vertical virtual screen positioned in front of a vehicle; and a plurality of additional lamp units controlled in light distribution so as to irradiate light to any one of left and right diffusion regions adjacent to the main light distribution pattern. The low beam light distribution pattern is formed on the vertical virtual screen by combining the basic lamp unit and the plurality of additional lamp units.

8 Claims, 7 Drawing Sheets

FIG.3
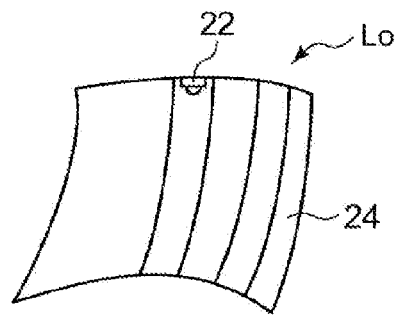
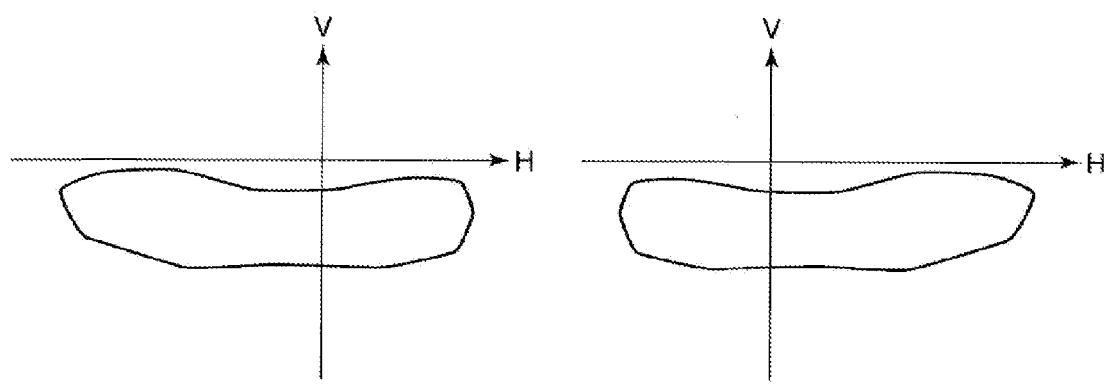
FIG.4A  FIG.4B

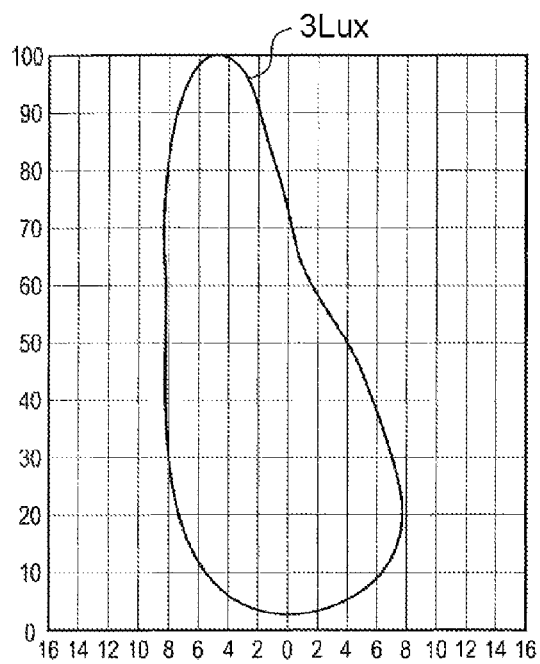 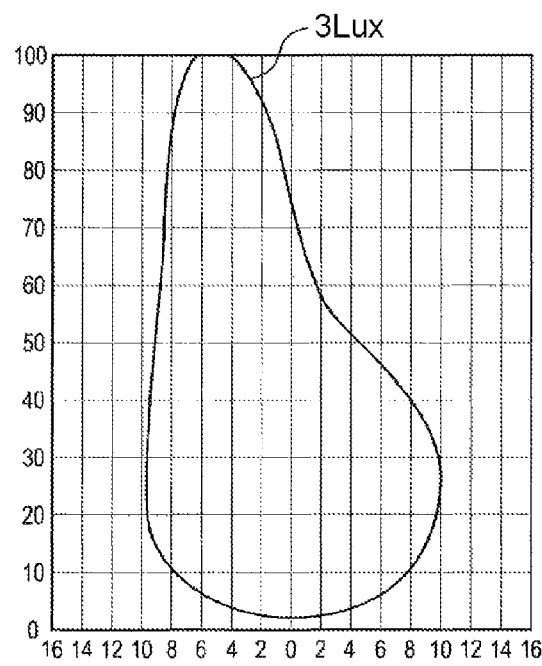
FIG.8A  FIG.8B
FIG.9
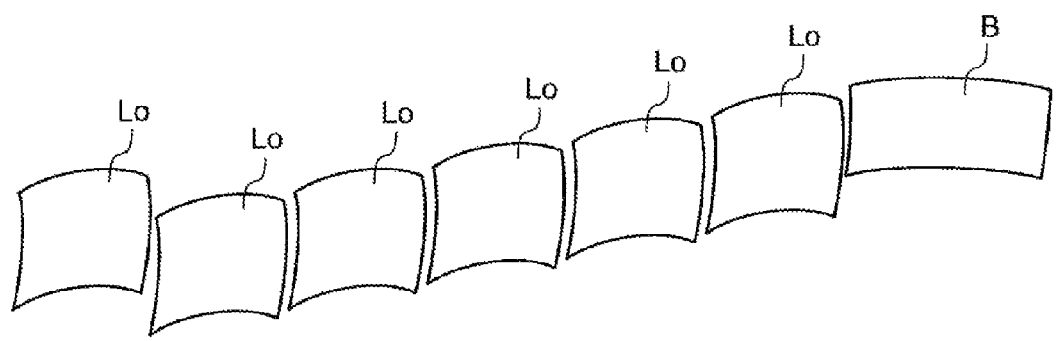

VEHICULAR HEADLAMP

CROSS-REFERENCE TO RELATED APPLICATIONS

This application is based on and claims priority from Japanese Patent Application No. 2013-005408, filed on Jan. 16, 2013 with the Japan Patent Office, the disclosure of which is incorporated herein in its entirety by reference.

TECHNICAL FIELD

The present disclosure relates to a multi-lamp type vehicular headlamp which includes a plurality of lamp units.

BACKGROUND

A multi-lamp type vehicular headlamp known in the related art is provided with a plurality of lamp units, each of which has an inherent light distribution characteristic. Such a vehicular headlamp has a configuration in which the plurality of lamp units are selectively turned ON, and the illumination lights from the respective lamp units that are turned ON are integrated with each other, thereby forming a light distribution pattern with a pattern shape or luminosity distribution so as to match with various vehicular traveling situations (see, e.g., Japanese Patent Laid-Open Nos. 2004-95480 and 2007-134052).

SUMMARY

By adopting the multi-lamp type vehicular headlamp, various designs of headlamps may be realized. However, since lamp units are required to be designed and fabricated for every design, there is a problem in that the cost increases.

The present disclosure has been made in consideration of the above-mentioned problem. An object of the present disclosure is to provide a technique which may commonize a plurality of lamp units used in a vehicular headlamp formed by combining the plurality of lamp units and realize various shapes thereof A vehicular headlamp in an aspect of the present disclosure inlcudes a basic lamp unit configured to form a main light distribution pattern that is controlled in light distribution so as to satisfy illuminance requirements at a plurality of predetermined sites in a low beam light distribution pattern which is projected on a vertical virtual screen positioned in front of a vehicle; and a plurality of additional lamp units controlled in light distribution so as to irradiate light to any one of left and right diffusion regions adjacent to the main light distribution pattern. The low beam light distribution pattern is formed on the vertical virtual screen by combining the basic lamp unit and the plurality of additional lamp units.

According to this aspect, vehicular headlamps of various shapes that may form a low beam light distribution pattern may be configured by combining two kinds of lamp units, that is, the basic lamp unit and the additional lamp units.

The plurality of additional lamp units may be installed to be arranged in a row in a substantially horizontal direction when viewed from the front of the vehicle. By doing this, a narrow vehicular headlamp may be realized.

The plurality of additional lamp units may be controlled in light distribution so as to form a light distribution pattern biased towad any one of left and right sides with respect to its optical axis, and may be installed along a curved body shape of a front part of the vehicle.

The vehicular headlamp may further include one or more second additional lamp units that are controlled in light distribution so as to form a high beam light distribution pattern when combined with the light distribututution pattern formed by the basic lamp unit and the plurality of additional lamp units. Accordingly, vehicular headlamps of various shapes that may form a high beam light distribution pattern may be configured by combining three kinds of lamp units, that is, the basic lamp unit, the additional lamp units and the second additional lamp units.

According to the present disclosure, vehicular headlamps of various shapes that may form a low beam light distribution pattern may be configured by combining two kinds of lamp units, that is, the basic lamp unit and the additional lamp units.

The above-described summary is illustration purposes only and does not intend to limit in any ways. In addition to the illustrative embodiment, examples, and features described above, additional embodiment, example, and features will become apparent by referring to the drawings and the following detailed description.

BRIEF DESCRIPTION OF THE DRAWINGS

FIG. 3 is a schematic front view illustrating an additional lamp unit according to an exemplary embodiment of the present disclosure.

FIGS. 4A and 4B are views illustrating examples of light distribution patterns formed by the additional lamp unit.

FIGS. 8A and 8B are graphs illustrating illuminance distributions on a road surface in front of a vehicle by the vehicular headlamps as illustrated in FIGS. 6 and 7, respectively.

FIG. 9 is a view illustrating an example in which one basic lamp unit and six additional lamp units are disposed in a V-shape.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

An exemplary embodiment of the present disclosure provides a vehicular headlamp which is configured by combining one basic lamp unit satisfying basic light distribution for each of left and right sides and two or more additional lamp units for each of the left and right sides, and thus, realizes a desired light distribution performance and/or a desired shape.

Figure 1:
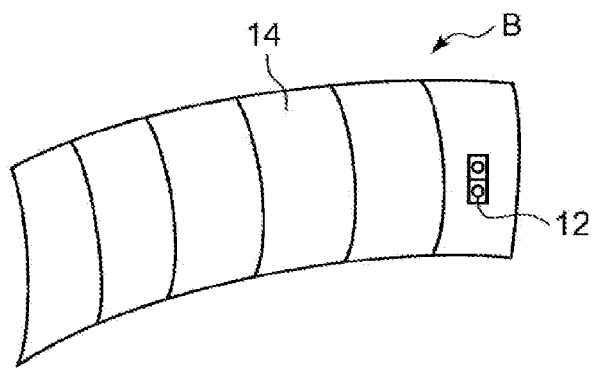
FIG. 1 is a schematic front view illustrating a basic lamp unit according to an exemplary embodiment of the present disclosure.

FIG. 1 is a schematic front view illustrating a basic lamp unit B according to an exemplary embodiment of the present disclosure. The basic lamp unit B is cofigured with one or more (two in FIG. 1) semiconductor light emitting elements 12, for example, light emitting diodes (LEDs), a reflector 14 having a reflective surface that reflects light generated from the semiconductor light emitting elements, and a transparent or translucent outer cover 16 (see FIG. 5).

The basic lamp unit B is configured so as to form a main light distribution pattern satisfying illuminance at a plurality of sites predetermined according to each country's regulations in a low beam light distribution pattern projected on a vertical virtual screen positioned in front (for example, 25 m ahead) of a vehicle. In other words, the basic lamp unit B is configured so as to satisfy a range greatly affecting the light distribution of the vehicular headlamp with only a pair of left and right lamps. The basic lamp unit B may be provided with aiming mechanisms in the left and right directions.

Figure 2:
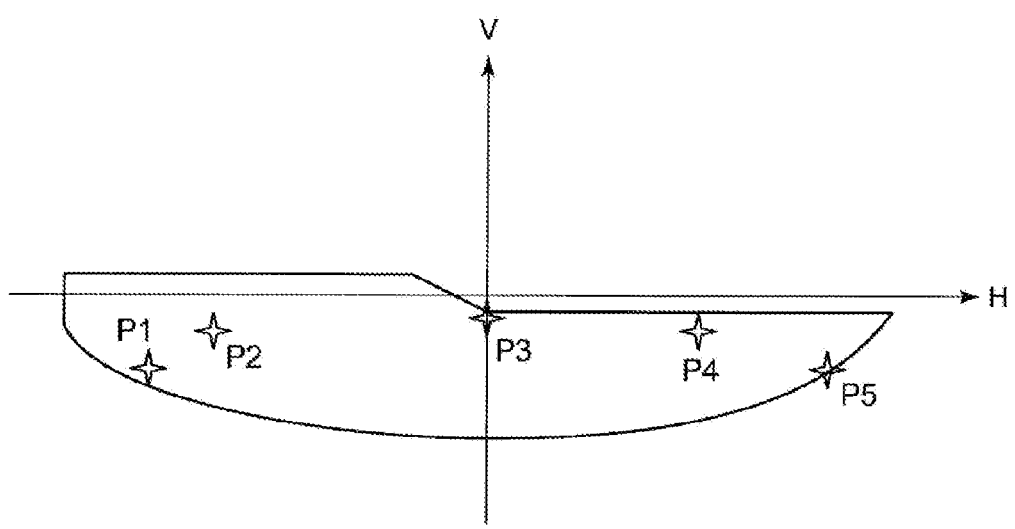
FIG. 2 is a view illustrating an example of regulation points which may be satisfied by a main light distribution pattern formed by the basic lamp unit.

FIG. 2 is a view illustrating an example of regulation points which may be satisfied by a main light distribution pattern formed by the basic lamp unit B. Further, the angle described blew refers to an anlge formed between a line connecting a point on a vertical virtual screen with a central point of a vehicle's front portion, and the central axis of the vehicle.

In FIG. 2, Point P1 is positioned at 4 degrees lower than the horizontal line and 20 degrees left side of the vertical line (4D-20L), and the lower limit of the illuminance has been determined. Likewise, Point P5 is positioned at 4 degrees lower than the horizontal line and 20 degrees right side of the vertical line (4D-20R), and the lower limit of the illuminance has been determined.

Point P2 is positioned at 1.72 degrees lower than the horizontal line and 16 degrees left side of the vertical line (1.72D-16L), and the lower limit of the illuminance has been determined. Point P4 is positioned at 1.72 degrees lower than the horizontal line and 11 degrees right side of the vertical line (1.72D-11R), and the lower limit of the illuminance has been determined.

Point P3 is positioned at 0.86 degrees lower than the horizontal line (0.86D), and the lower limit of the illuminance has been determined.

FIG. 3 is a schematic front view illustrating an additional lamp unit Lo according to an exemplary embodiment of the present disclosure. The additional lamp unit Lo is configured with one or more (one in FIG. 3) semiconductor light emitting elements 22, for example, LEDs, a reflector 24 having a reflective surface that reflects light generated from the semiconductor light emitting elements, and a transparent or translucent outer cover 26 (see FIG. 5).

The additional lamp unit Lo is controlled in light distribution so as to irradiate light to any one of left and right diffusion regions adjacent to the main light distribution pattern. FIGS. 4A and 4B are examples thereof. FIG. 4A illustrats a light distribution pattern of the additional lamp unit in the vehicular headlamp disposed at the left side of the vehicle's front portion, and FIG. 4B illustrats a light distribution pattern of the additional lamp unit in the vehicular headlamp disposed at the right side of the vehicle's front portion. A plurality of the additional lamp units may form the same light distribution patterns or different light distribution patterns.

As described above, the light distribution performance required by each country's regulations is satisfied by a pair of the left and right basic lamp units. As a result, the additional lamp units may be relatively freely arranged mainly with an emphasis on its appearance. In addition, if an upper limit of illuminance is determined in the relgulations, the additional lamp units may also be required to be arranged in consideration of the illuminance of the light distribution pattern formed by a combination of the basic lamp unit and the additional lamp units.

Figure 5:
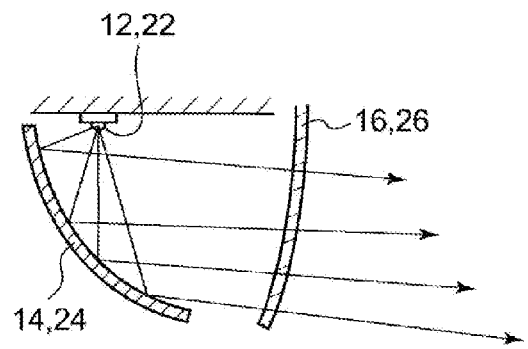
FIG. 5 is a schematic cross sectional view illustrating a basic configuration of the basic lamp unit and the additional lamp unit.

FIG. 5 is a schematic cross sectional view when the basic lamp unit B or the additional lamp unit Lo is cut by a vertical plane including each optical axis. Each of the respective lamp units includes at least the semiconductor light emitting element 14 or 24 that is arranged downward, the reflector 14 or 24 that has a reflective surface in a shape based on a rotary paraboloid, and the outer cover 16 or 26 that is arranged ahead of the reflector in front of the vehicle. The reflector 14 or 24 is controlled in light distribution so as to reflect light generated from the semiconductor light emitting element 12 or 22 in the substantially horizontal direction, as illustrated in solid line trajectories in the figure.

Figure 6:
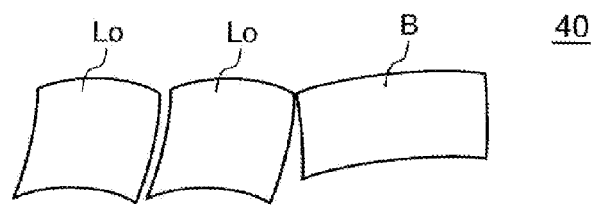
FIG. 6 is a view illustrating an example of a combination of the basic lamp unit and the additional lamp units in order to form a synthetic light distribution pattern for a low beam.

FIG. 6 illustrates an example of a combination of the basic lamp unit B and the additional lamp units Lo in order to form a synthetic light distribution pattern for a low beam. In this example, one basic lamp unit B and two additional lamp units Lo are arranged in the substantially horizontal direction, when viewed from the front of the vehicle, to configure a generally narrow vehicular headlamp 40.

Figure 7:
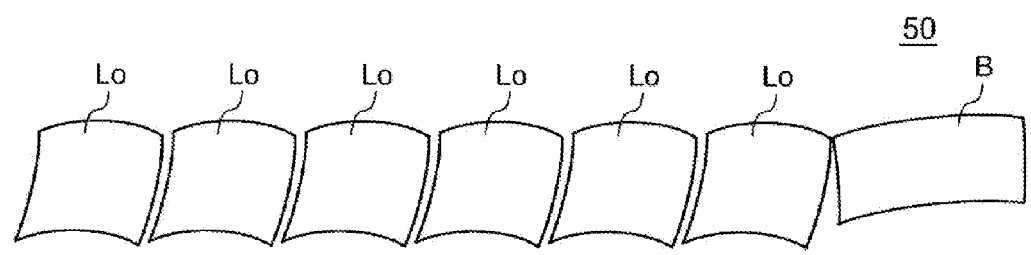
FIG. 7 is a view illustrating another example of a combination of the basic lamp unit and the additional lamp units in order to form a synthetic light distribution pattern for a low beam.

FIG. 7 illustrates another example of a combination of the basic lamp unit B and the additional lamp units Lo in order to form a synthetic light distribution pattern for a low beam. In this example, one basic lamp unit B and six additional lamp units Lo are arranged in the substantially horizontal direction, when viewed from the front of the vehicle, so as to configure a generally narrow vehicular headlamp 50.

As described above, narrow vehicular headlamps of various shapes may be configured simply with only two kinds of lamp units.

FIGS. 8A and 8B illustrate simulation results of illuminance on a road surface in front of the vehicle by the vehicular headlamps 40, 50 as illustrated in FIGS. 6 and 7, respectively. Here, the simulation was performed with the basic lamp unit having a luminous flux of 850 lumens and the additional lamp units having a luminous flux of 150 lumens. The lines in FIGS. 8A and 8B represent a range of 3 lux. It is understood that the vehicular headlamp 50 has a wider irradiation range than the vehicular headlamp 40.

The basic lamp unit and the additional lamp units may be arranged in various shapes, as well as in a linear shape. FIG. 9 illustrates a vehicular headlamp 60 in which one basic lamp unit and six additional lamp units are disposed in a V-shape.

As described above, a narrow vehicular headlamp in a desired shape may be configured simply with only two kinds of lamp units.

Figure 10:
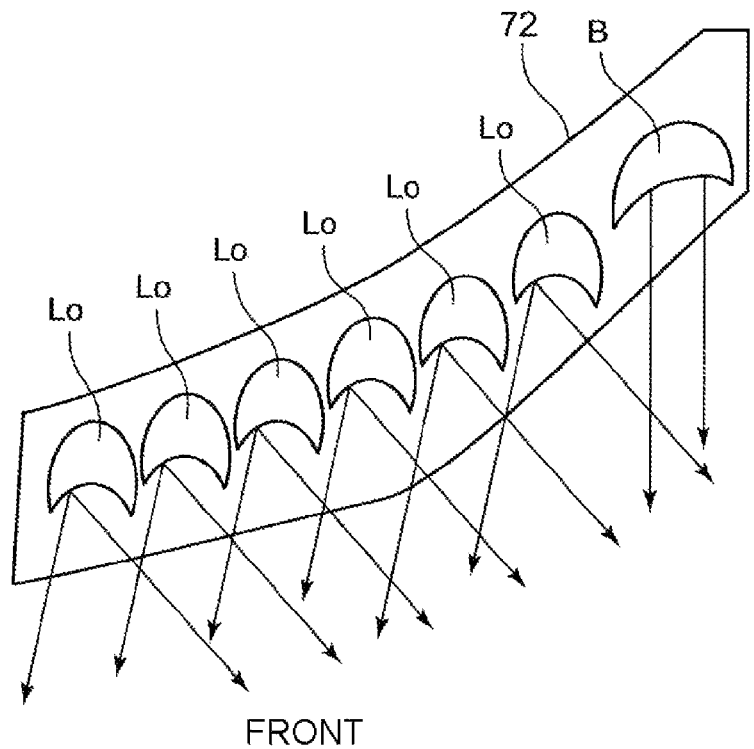
FIG. 10 is a schematic plan view illustrating a vehicular headlamp including one basic lamp unit and six additional lamp units.

FIG. 10 is a schematic plan view illustrating a vehicular headlamp 70 including one basic lamp unit B and six additional lamp units Lo. The vehicular headlamp 70 is provided at the right side of the vehicle's front portion. In the example of FIG. 10, the additional lamp units Lo are controlled in light distribution so as to form a light distribution pattern biased towad any one of left and right sides with respect to its optical axis (toward the right side in FIG. 10), and the additional lamp units Lo and the basic lamp unit B are installed along a curved body shape 72 of a front part of the vehicle. As such, when the positions of the additional lamp units and the basic lamp unit in the vhhicular depth direction are shifted, a vehicular headlamp matched to the shape of the vehicle's front portion having a slant may be easily formed. Further, the depth of the vehicular headlamp may be reduced.

Figure 11:
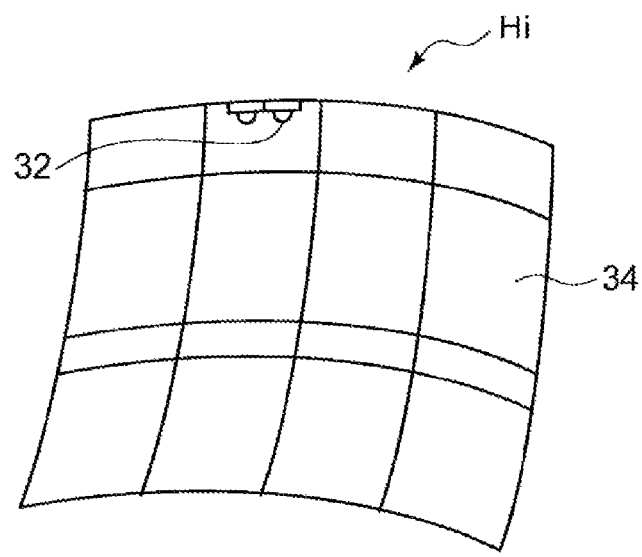
FIG. 11 is a schematic plan view illustrating a second additional lamp unit which may be additionally combined with the basic lamp unit and the additional lamp units to form a synthetic light distribution pattern for a high beam.

FIG. 11 is a schematic plan view illustrating a second additional lamp unit Hi which may be additionally combined with the basic lamp unit and the additional lamp units to form a synthetic light distribution pattern for a high beam. The additional lamp unit Hi is configured with one or more (two in FIG. 11) semiconductor light emitting elements 32, for example, LEDs, a reflector 34 having a reflective surface that reflects light generated from the semiconductor light emitting elements, and a transparent or translucent outer cover (not illustrated). The second additional lamp unit Hi is controlled in light distribution so as to irradiate at least a portion on a vertical virtual screen higher than the horizontal line H.

Figure 12:
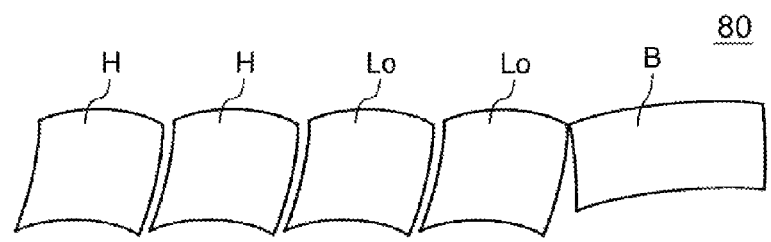
FIG. 12 is a view illustrating an example of a combination of the basic lamp unit, the additional lamp units and the second additional lamp units in order to form a synthetic light distribution pattern for a high beam.

FIG. 12 illustrates an example of a combination of the basic lamp unit B, the additional lamp units Lo, and the second additional lamp units Hi in order to form a synthetic light distribution pattern for a high beam. In this example, two additional lamp units Hi are additionally arranged in the substantially horizontal direction in the combination of one basic lamp unit B and two additional lamp units Lo as illustrated in FIG. 6, so as to configure a generally narrow vehicular headlamp 80.

Figure 13:
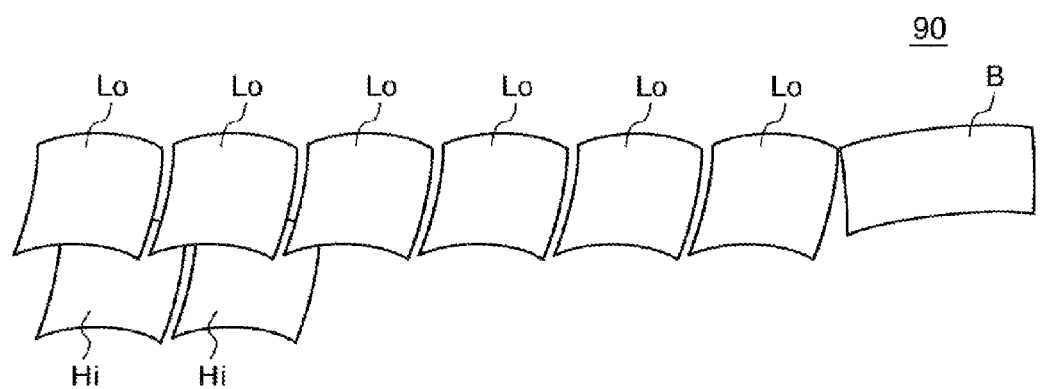
FIG. 13 is a view illustrating another example of a combination of the basic lamp unit, the additional lamp units and the second additional lamp units in order to form a synthetic light distribution pattern for a high beam.

FIG. 13 illustrates another example of combination of the basic lamp unit B, the additional lamp units Lo and the second additional lamp units Hi in order to form a synthetic light distribution pattern for a high beam. In this example, two second additional lamp units Hi are additionally arranged contiguously with the bottom of two left additional lamp units Lo in the combination of one basic lamp unit B and six additional lamp units Lo as illustrated in FIG. 7, so as to configure a generally narrow vehicular headlamp 80.

As described above, vehicular headlamps of various shapes which may form a low beam light distribution pattern and a high beam light distribution pattern, may be configured simply with only two kinds of lamp units.

Figure 14A:
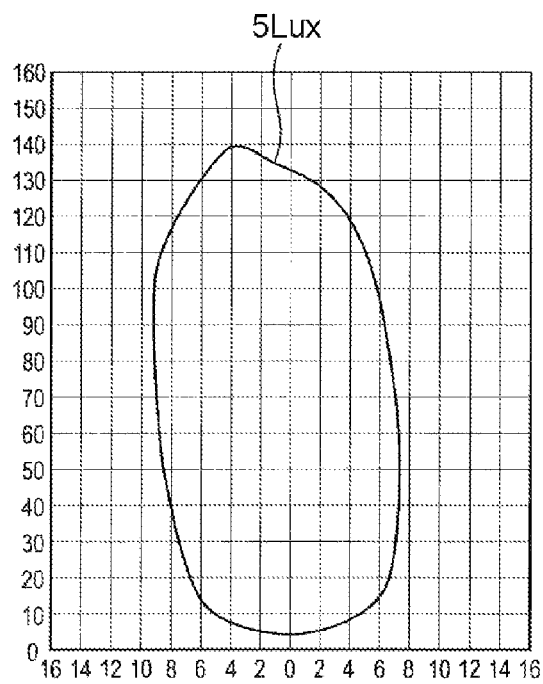
FIGS. 14A and 14B are graphs illustrating illuminance distributions on a road surface in front of a vehicle by the vehicular headlamps as illustrated in FIGS. 12 and 13, respectively.
Figure 14B:
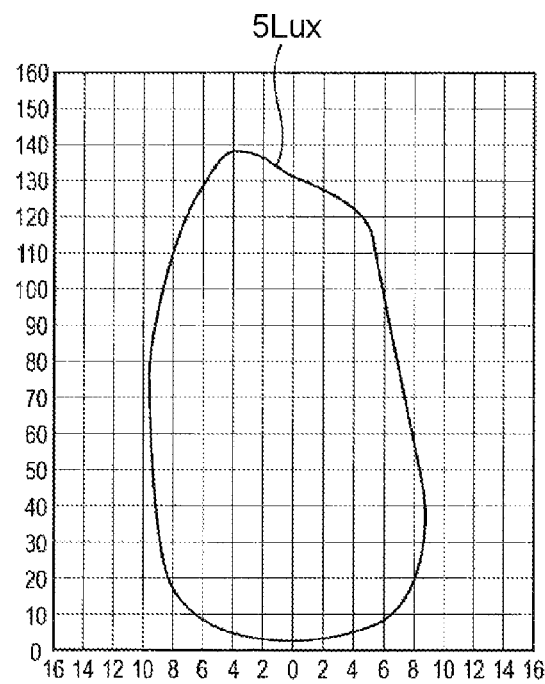

FIGS. 14A and 14B illustrate simulation results of illuminance distributions on a road surface in front of the vehicle by the vehicular headlamps 80, 90 as illustrated in FIGS. 12 and 13, respectively. Here, the simulation was performed with the basic lamp unit having a luminous flux of 850 lumens, the additional lamp units having a luminous flux of 150 lumens and the second additional lamp units having a lunious flux of 850 lumens. The lines in FIGS. 14A and 14B represent a range of 5 lux. It is understood that the vehicular headlamp 90 has a wider irradiation range than the vehicular headlamp 80.

As described above, according to the present exemplary embodiment, vehicular headlamps of various shapes which may form a low beam light distribution pattern, are configured with two kinds of lamp units, that is, the basic lamp unit and the additional lamp units. Accordingly, since exclusive lamp units are not requred to be designed and fabricated for every design, the cost decreases.

In the exemplary embodiment, the vehicular headlamp is configured so as to satisfy a light distribution performance, which is required by each country's regulations, only with the basic lamp unit. Therefore, even if there are variations in performance with the additional lamp units, influences on a synthetic light distribution pattern are marginal, resulting in a very high degree of freedom with respect to the number and the layout of additional lamp units to be installed.

In the exemplary embodiments, it has been described that the basic lamp unit, the additional lamp units and the second additional lamp units include a reflector that has a reflective surface in a shape based on a rotary paraboloid. However, some or all of the basic lamp unit, the additional lamp units and the second additional lamp units may be replaced with a projector type lamp unit having a reflective surface based on a spheroid, or a monofocal type lamp unit.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp, comprising:
   a basic lamp unit configured to form a main light distribution pattern that is controlled in light distribution so as to satisfy illuminance requirements at a plurality of predetermined sites in a low beam light distribution pattern which is projected on a vertical virtual screen positioned in front of a vehicle; and
   a plurality of additional lamp units controlled in light distribution so as to irradiate light to any one of left and right diffusion regions adjacent to the main light distribution pattern,
   wherein the vehicular headlamp is formed to match a slanted shape of the vehicle's front portion by shifting the positions of the basic lamp unit and the plurality of the additional lamp units relative to the vehicular depth direction, and
   wherein the low beam light distribution pattern is formed on the vertical virtual screen by combining the basic lamp unit and the plurality of additional lamp units.

2. The vehicular headlamp according to claim 1, wherein the plurality of additional lamp units are installed to be arranged in a row in a substantially horizontal direction when viewed from the front of the vehicle.

3. The vehicular headlamp according to claim 1, wherein the plurality of additional lamp units are controlled in light distribution so as to form a light distribution pattern biased toward any one of left and right sides with respect to its optical axis, and are installed along a curved body shape of a front part of the vehicle.

4. The vehicular headlamp according to claim 2, wherein the plurality of additional lamp units are controlled in light distribution so as to form a light distribution pattern biased toward any one of left and right sides with respect to its optical axis, and are installed along a curved body shape of a front part of the vehicle.

5. The vehicular headlamp according to claim 1, further comprising one or more second additional lamp units which are controlled in light distribution so as to form a high beam light distribution pattern when combined with the light distribution pattern formed by the basic lamp unit and the plurality of additional lamp units,
wherein the one or more second additional lamp units are arranged in the substantially horizontal direction or are arranged contiguously with the bottom of the additional lam unit in the combination of the basic lamp unit and the plurality of additional lamp units.

6. The vehicular headlamp according to claim 2, further comprising one or more second additional lamp units which are controlled in light distribution so as to form a high beam light distribution pattern when combined with the light distribution pattern formed by the basic lamp unit and the plurality of additional lamp units,
wherein the one or more second additional lamp units are arranged in the substantially horizontal direction or are arranged contiguously with the bottom of the additional lamp unit in the combination of the basic lamp unit and the plurality of additional lamp units.

7. The vehicular headlamp according to claim 3, further comprising one or more second additional lamp units which are controlled in light distribution so as to form a high beam light distribution pattern when combined with the light distribution pattern formed by the basic lamp unit and the plurality of additional lamp units,
wherein the one or more second additional lamp units are arranged in the substantially horizontal direction or are arranged contiguously with the bottom of the additional lam unit in the combination of the basic lamp unit and the plurality of additional lamp units.

8. The vehicular headlamp according to claim 4, further comprising one or more second additional lamp units which are controlled in light distribution so as to form a high beam light distribution pattern when combined with the light distribution pattern formed by the basic lamp unit and the plurality of additional lamp units,
wherein the one or more second additional lamp units are arranged in the substantially horizontal direction or are arranged contiguously with the bottom of the additional lamp unit in the combination of the basic lamp unit and the plurality of additional lamp units.

* * * * *